United States Patent
Liu et al.

(10) Patent No.: US 8,238,761 B2
(45) Date of Patent: *Aug. 7, 2012

(54) OPTICAL RECEIVER WITH A CALIBRATION MODE

(75) Inventors: Frankie Y. Liu, Palo Alto, CA (US);
Dinesh D. Patil, Fremont, CA (US);
Ronald Ho, Mountain View, CA (US);
Elad Alon, El Cerrito, CA (US)

(73) Assignee: Oracle America, Inc., Redwood Shores, CA (US)

(*) Notice: Subject to any disclaimer, the term of this patent is extended or adjusted under 35 U.S.C. 154(b) by 308 days.

This patent is subject to a terminal disclaimer.

(21) Appl. No.: 12/633,934

(22) Filed: Dec. 9, 2009

(65) Prior Publication Data

US 2011/0135315 A1    Jun. 9, 2011

(51) Int. Cl.
*H04B 10/06* (2006.01)
(52) U.S. Cl. .................................. 398/209; 398/202
(58) Field of Classification Search .............. 398/202, 398/209
See application file for complete search history.

(56) References Cited

U.S. PATENT DOCUMENTS

| | | | | |
|---|---|---|---|---|
| 5,063,612 | A * | 11/1991 | McKeown | 398/136 |
| 5,088,107 | A * | 2/1992 | Piasecki et al. | 375/224 |
| 2004/0184708 | A1* | 9/2004 | Ghandi et al. | 385/16 |

* cited by examiner

*Primary Examiner* — Leslie Pascal
(74) *Attorney, Agent, or Firm* — Park, Vaughan, Fleming & Dowler LLP; Steven E. Stupp

(57) ABSTRACT

An optical receiver is described. This optical receiver includes a digital feedback circuit that biases a front-end circuit, which receives an optical signal, so that an analog electrical signal output by the front-end circuit is calibrated relative to a reference voltage corresponding to a decision threshold of a digital slicer in the optical receiver. In particular, during a calibration mode the feedback circuit may determine and store a calibration value that calibrates the analog electrical signal relative to the reference voltage. Then, during a normal operating mode, the feedback circuit may output a current corresponding to the stored calibration value that specifies a bias point of the front-end circuit.

20 Claims, 14 Drawing Sheets

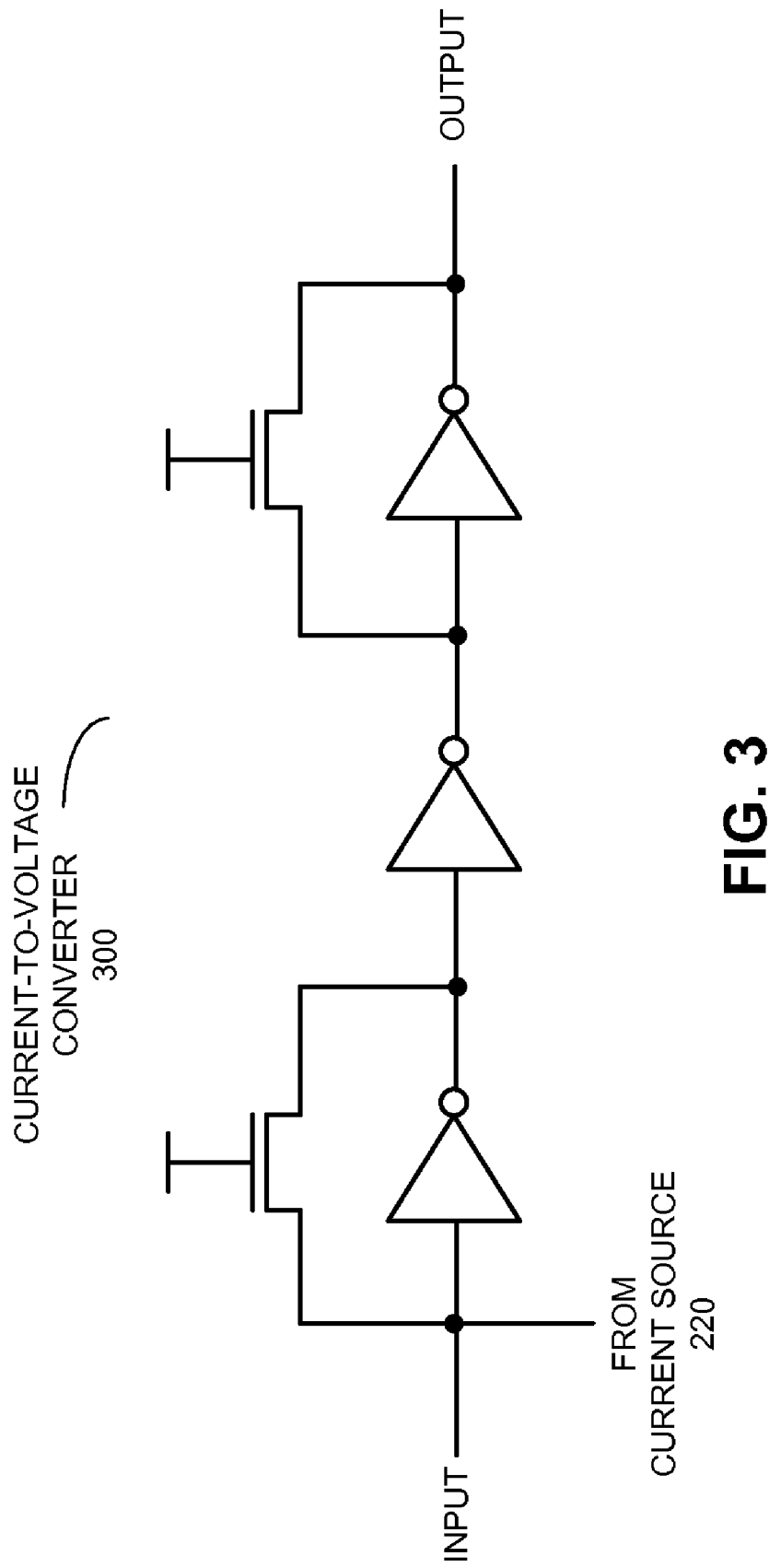

US 8,238,761 B2

OPTICAL RECEIVER WITH A CALIBRATION MODE

GOVERNMENT LICENSE RIGHTS

The United States Government has a paid-up license in this invention and the right in limited circumstances to require the patent owner to license others on reasonable terms as provided for by the terms of Agreement No. HR0011-08-9-0001 awarded by the Defense Advanced Research Projects Administration.

CROSS REFERENCE TO RELATED APPLICATIONS

This application is related to U.S. patent application Ser. No. 12/633,940, entitled "Technique for Calibrating and Centering an Optical Receiver," by Philip Amberg, Dinesh D. Patil and Frankie Y. Liu, filed 9 Dec. 2009, the contents of which are herein incorporated by reference.

BACKGROUND

1. Field

The present disclosure relates to an optical receiver, and in particular, to an optical receiver that can be calibrated during a calibration mode.

2. Related Art

In a typical optical receiver, an optical signal is received by a photodiode, which generates current that is amplified by a current-to-voltage converter. This photodiode generates the current when the optical signal is present.

Typically, the optical signal is modulated by a transmitter with a finite extinction ratio, which results in an optical signal that is not fully turned 'on' or 'off.' Instead there is a finite ratio of the optical-signal levels, with an average DC level between them. As a consequence, the current has two components, an average current (Iavg) and a delta- or signal current (Isig) superimposed on Iavg (usually, Isig is a fraction of Iavg). For binary data, the transmitter modulates an optical source so that the photodiode outputs either Iavg−Isig (which corresponds to a logical '0') or Iavg+Isig (which corresponds to a logical '1').

Moreover, the optical path also usually introduces attenuation to the optical signal levels that are not known a priori to the time of assembly, and which can vary during normal operation of an optical link. As a consequence, the average DC level of the optical signal (and thus, Iavg) can vary over a wide range of possible values.

A current-to-voltage converter in an optical receiver typically includes one or more gain stages followed by a decision circuit (such as a digital slicer), which converts an analog current into digital voltage levels. Because the gain stage(s) usually has a narrow window of operation, the variation in the average DC level can pull the current-to-voltage converter away from its optimal DC-gain point.

Consequently, a crossover voltage (Vc) of the output-voltage swing and the biasing of the current-to-voltage converter are typically adjusted to ensure that the output voltages from the optical receiver correctly correspond to a logical '1' (when the current-to-voltage converter outputs a high voltage, Vhi) and a logical '0' (when the current-to-voltage converter outputs a low voltage, Vlow). In existing optical receivers, adaptive adjustment of a reference voltage (Vref) to which the output voltage is compared (which is sometimes referred to as 'centering') and the biasing of the current-to-voltage converter (which is sometimes referred to as 'calibration') are performed in a variety of ways. For example, an RC (low-pass) filter can be used to obtain Vref from the output voltage. However, because the RC filter passes low frequency information, in these techniques the optical signal is typically DC balanced. Furthermore, the RC-filter bandwidth typically needs to be high enough to track changes in the DC level of the output voltage, while being low enough to provide a stable value of Vref between bits.

In some existing optical receivers, DC-balanced codes (such as 8/10 codes) are used to significantly reduce the RC-filter bandwidth at the cost of added latency. Alternatively, if the environmental variations are slow, periodic calibration can be performed, and Vref can be stored on a capacitor. However, this technique may be difficult to implement due to leakage current from the capacitor and the inability to scale an on-chip capacitor.

In other existing optical receivers, biasing and Vref are obtained from the output voltage using an RC-feedback circuit that includes an RC filter. However, it may be difficult to stabilize the feedback loop while ensuring that it is fast enough to track changes. Even if the feedback loop is stable, relative to other approaches these optical receivers typically include additional switches and capacitors to prevent loading of the current-to-voltage converter output and to store the bias voltage, which increases the cost, power consumption and complexity of the optical receivers.

Hence, what is needed are an optical receiver and a calibration technique without the above-described problems.

SUMMARY

One embodiment of the present disclosure provides an optical receiver that includes a front-end circuit that receives an optical signal and provides an analog electrical signal. Moreover, the optical receiver includes a digital slicer, coupled to the front-end circuit, which determines a digital electrical signal from the analog electrical signal based at least on a reference voltage that specifies a decision threshold of the digital slicer, where the reference voltage corresponds to the analog electrical signal when the optical signal is a predetermined optical signal. Furthermore, the optical receiver includes a feedback circuit coupled to the digital slicer and the front-end circuit, where, during a calibration mode of the optical receiver, the feedback circuit determines and stores a calibration value that calibrates the analog electrical signal relative to the reference voltage. Additionally, during a normal operating mode of the optical receiver, the feedback circuit outputs a current corresponding to the stored calibration value that specifies a bias point of the front-end circuit.

In some embodiments, the feedback circuit includes: an integrator coupled to the digital slicer; a digital-to-analog converter (DAC) coupled to the integrator; and a voltage-controlled current source coupled to the DAC, the front-end circuit and a power-supply node (which may be coupled to ground). Note that the voltage-controlled current source may bias the front-end circuit by adjusting a current through the voltage-controlled current source from the front-end circuit to the power-supply node. Furthermore, the front-end circuit may include: a photodiode; an internal node coupled to the photodiode and the voltage-controlled current source; and a first current-to-voltage converter coupled to the internal node, where the current through the voltage-controlled current source specifies the bias point of the first current-to-voltage converter. Note that the digital slicer may include a sense amplifier and/or the optical signal may correspond to a data pattern without a run-length limit constraint.

In some embodiments, the reference voltage is provided by a second current-to-voltage converter, which is a replica of at least a portion of the front-end circuit, where an input of the second current-to-voltage converter is the analog electrical signal when the optical signal is the predetermined optical signal. For example, the predetermined optical signal may include a null pattern.

In some embodiments, the optical receiver includes control logic configured that transitions the optical receiver from the normal operating mode to the calibration mode and from the calibration mode to the normal operating mode during recalibration of the optical receiver. This recalibration may be performed periodically.

During the recalibration mode, the optical receiver may receive another predetermined optical signal that includes a sequence of alternating groups of symbol types that correspond to binary values, where a given group in the alternating groups has an associated duration that is sufficient for the current output by the feedback circuit to reach a steady-state value. Moreover, during the recalibration mode, the current may be adjusted to reduce a difference between the analog electrical signal and the reference voltage. After the current reaches the steady-state value, the analog electrical signal may dither around a voltage corresponding to a binary value associated with the given group and/or the feedback circuit may store the voltage corresponding to the steady-state value. Note that the calibration value may correspond to a digital sum of stored voltages corresponding to the binary values. For example, the calibration value may be determined using a look-up table that is indexed by stored voltages corresponding to the binary values.

In some embodiments, during the normal operating mode, the current is approximately mid-way between a high current output by the front-end circuit for a first of the binary values and a low current output by the front-end circuit for a second of the binary values.

Another embodiment provides a system that includes an optical transmitter, which provides the optical signal corresponding to a data pattern, and the optical receiver. During the recalibration mode, the optical transmitter may provide the other predetermined optical signal corresponding to the alternating sequence of groups of the first symbol type and groups of the second symbol type.

Another embodiment provides a method for calibrating the optical receiver. During the method, the front-end circuit provides the analog electrical signal based at least on the received optical signal. Then, the digital slicer determines the digital electrical signal from the analog electrical signal. Next, during the calibration mode, the feedback circuit determines and stores a calibration value that calibrates the analog electrical signal relative to the reference voltage. Furthermore, during the normal operating mode of the optical receiver, the feedback circuit outputs a current corresponding to the stored calibration value that specifies the bias point of the front-end circuit.

BRIEF DESCRIPTION OF THE FIGURES

FIG. 3 is a block diagram illustrating a current-to-voltage converter in the optical receivers of FIGS. 2A and 2B in accordance with an embodiment of the present disclosure.

Figure 1:
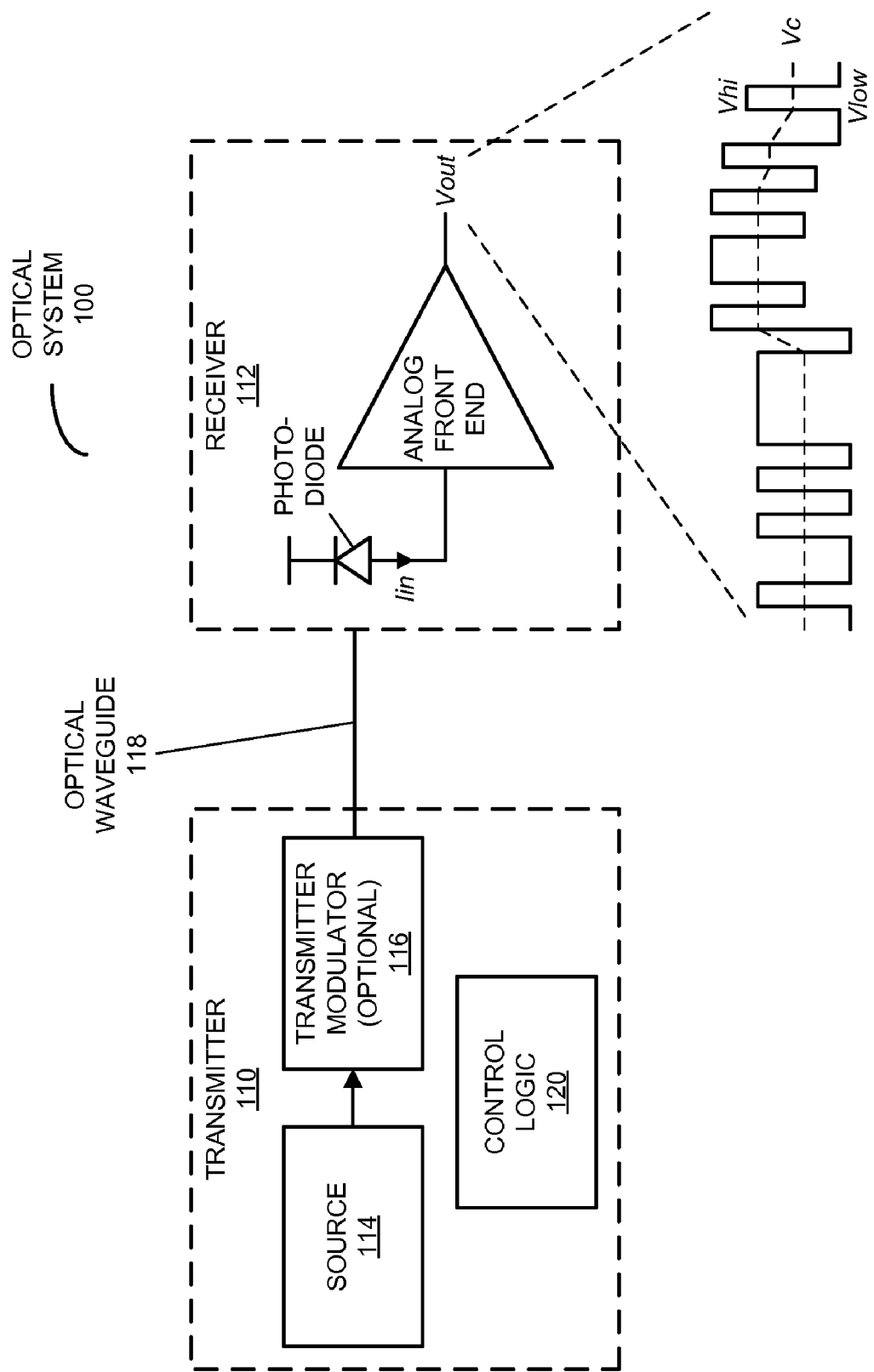
FIG. 1 is a block diagram illustrating an optical system in accordance with an embodiment of the present disclosure.

Table 1 provides pseudo-code for a calibration technique in accordance with an embodiment of the present disclosure.

Table 2 provides pseudo-code for a calibration technique in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

The following description is presented to enable any person skilled in the art to make and use the disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not intended to be limited to the embodiments shown, but is to be accorded the widest scope consistent with the principles and features disclosed herein.

Embodiments of an optical system, an optical receiver in the optical system, and a process for calibrating the optical receiver are described.

In the discussion that follows, 'calibrating' the optical receiver should be understood to include adjusting the bias of the current-to-voltage converter in the optical receiver and/or adjusting the reference voltage (Vref) of the output-voltage swing (as determined by a decision threshold of a digital slicer in the optical receiver). Furthermore, communication of binary data is used as an illustrative example. However, in other embodiments, more-than-two-level data can be communicated using the optical receiver and/or the optical system.

We now describe embodiments of an optical system and an optical receiver. FIG. 1 presents a block diagram illustrating an optical system 100. This optical system includes an optical transmitter 110 and an optical receiver 112. During a normal operating mode, source 114 and optional transmitter modulator 116 in optical transmitter 110 provide an optical signal (corresponding to a data pattern) to optical receiver 112 via optical waveguide 118. However, during a calibration mode, optical transmitter 110 provides an optical signal corresponding to a calibration pattern.

Note that control logic 120 may provide instructions or signals that transition optical transmitter 110 to the calibration mode from the normal operating mode, and from the calibration mode to the normal operating mode. However, in some embodiments, other than these 'start' and 'stop' instructions or signals, the calibration technique may not require further synchronization between optical transmitter 110 and optical receiver 112.

Figure 2A:
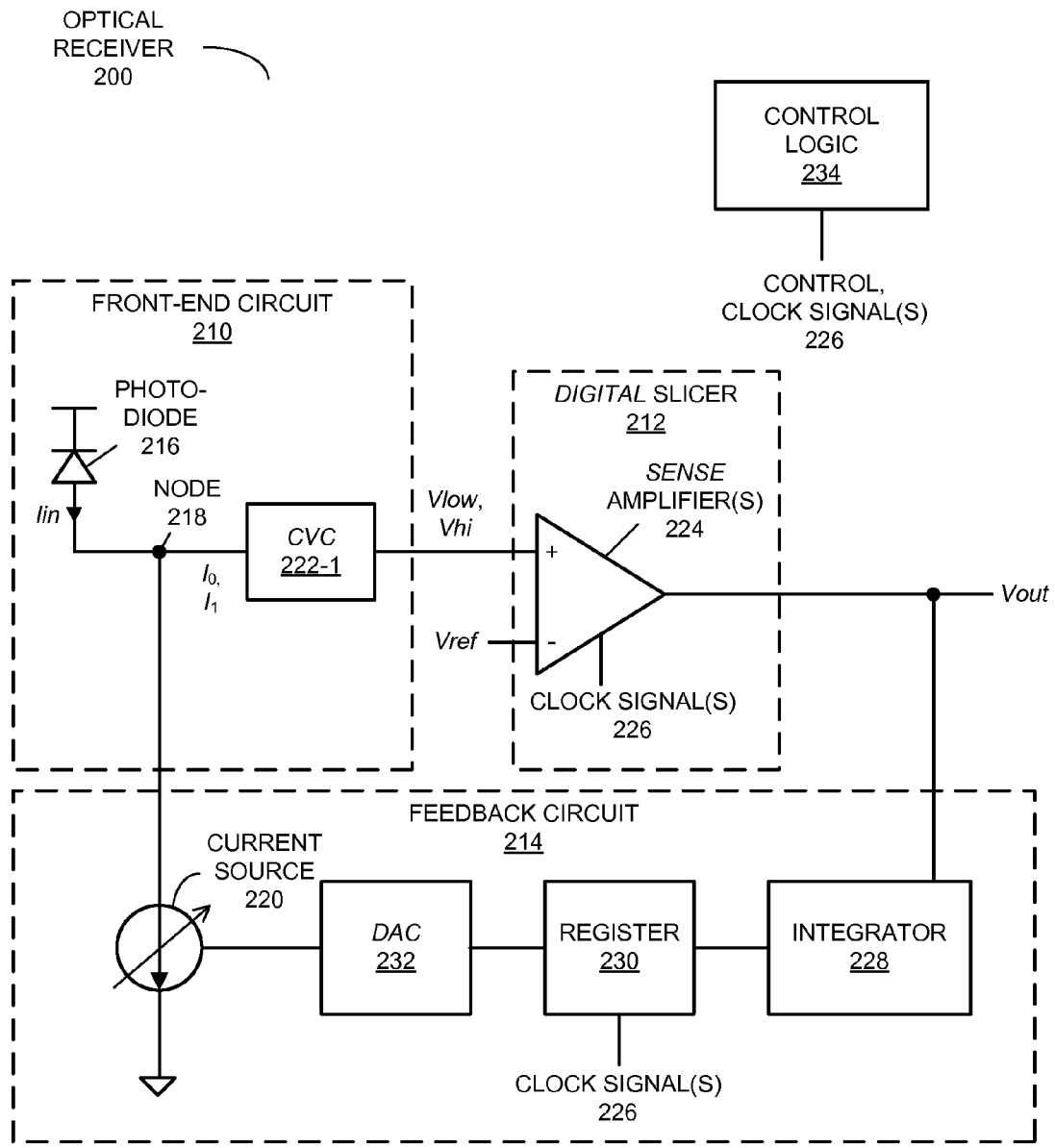
FIG. 2A is a block diagram illustrating an optical receiver in the optical system of FIG. 1 in accordance with an embodiment of the present disclosure.

FIG. 2A presents a block diagram illustrating an optical receiver 200, such as optical receiver 112 in optical system 100 (FIG. 1). This optical receiver may include a front-end circuit 210 that receives an optical signal and provides an analog electrical signal. Furthermore, optical receiver 200 includes a digital slicer 212 (such as one or more sense amplifier(s) 224 having Vref as a zero-to-one decision threshold) that determines a digital electrical signal from the analog electrical signal, and a feedback circuit 214 (which includes a voltage-controlled current source 220, such as a transistor). In addition, front-end circuit 210 includes: a photodiode 216 (which outputs a variable current Iin), an internal node 218; and a current-to-voltage converter (CVC) 222-1 (such as a resistor or a trans-impedance amplifier).

Figure 2B:
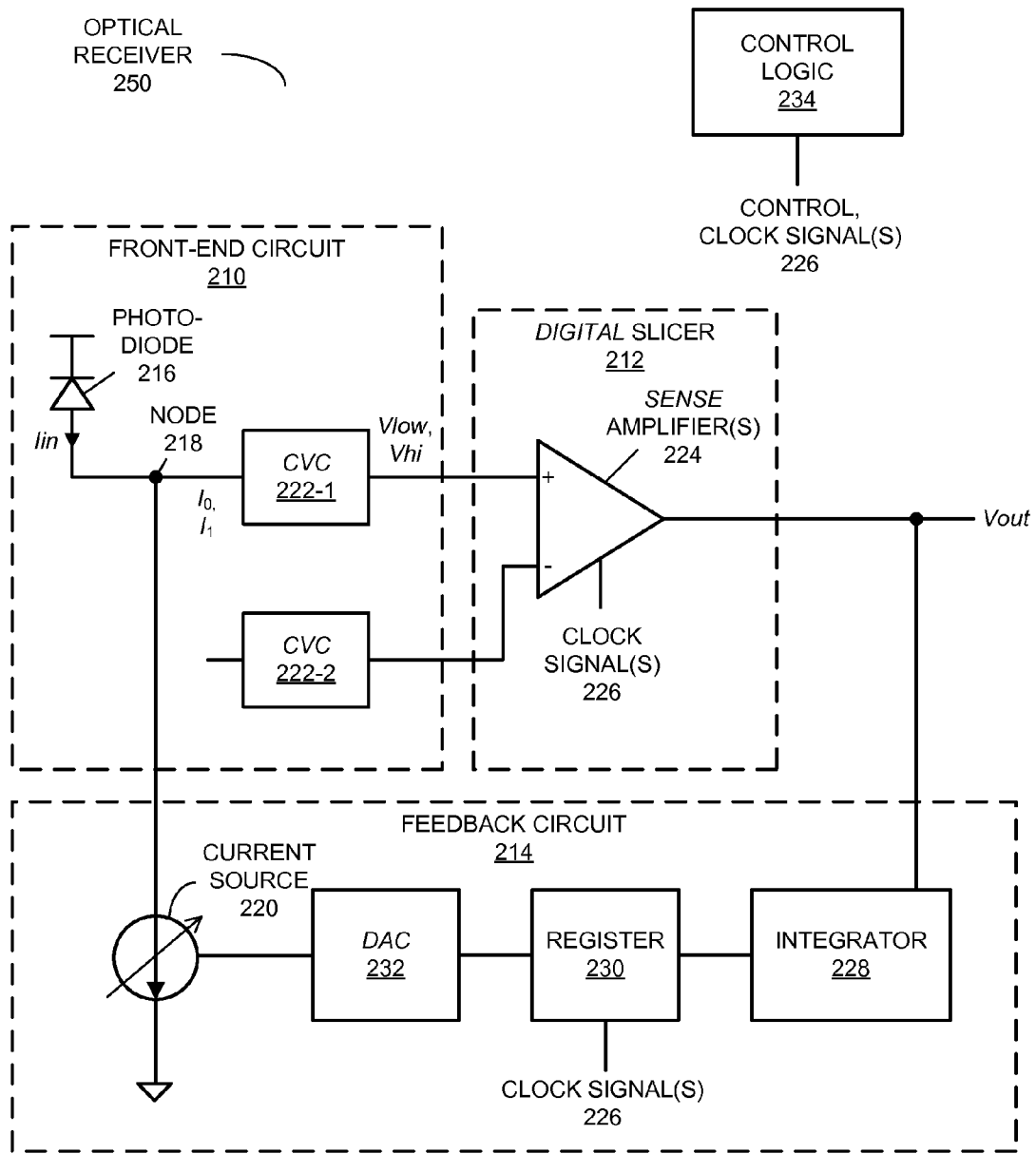
FIG. 2B is a block diagram illustrating an optical receiver in the optical system of FIG. 1 in accordance with an embodiment of the present disclosure.

As shown in FIG. 2B, which presents a block diagram illustrating optical receiver 250 (such as optical receiver 112 in optical system 100 in FIG. 1), in some embodiments Vref is provided by current-to-voltage converter 222-2. Current-to-voltage converter 222-2 may be a replica of current-to-voltage converter 222-1, and may have no or zero input. Note that current-to-voltage converter 222-2 (and, thus, Vref) may track operating and process variations in current-to-voltage converter 222-1.

In an exemplary embodiment, optical receivers 200 (FIG. 2A) and 250 are specified to work at 5 Gbps for a single-ended optical input ranging from −6 to −15 dBm average intensity. Photodiode 216 may have a responsivity ranging from 0.5 to 1 A/W. Assuming an extinction ratio of 6 dB, the current swing at the optical-receiver input may be as low as 20 μA to p-p. Furthermore, the dark current $I_0$ may be as large as 10 μA, and the parasitic device and bonding-pad capacitance may be as large as 80 fF. The maximum allocated power may be 6 mW, with an area constraint of 4000 μm².

FIG. 3 presents a block diagram illustrating an exemplary embodiment of current-to-voltage converter 300, such as current-to-voltage converter 222-1 in optical receivers 200 and 250 (FIGS. 2A and 2B). This is a single-ended current-to-voltage converter. With a transimpedance of 10 kΩ, current-to-voltage converter 300 produces a voltage swing of 200 mV at the lowest photo-current signal, which means at least 100 mV of differential signal for the sense amplifiers around Vref This may be sufficient to overcome the 6σ offset of 70 mV, and may provide sufficient signal to noise (assuming a conservative sense-amplifier noise estimate of 2 mV) to obtain a bit-error rate of better than $10^{-15}$. Note that while FIG. 3 illustrates a particular embodiment of a current-to-voltage converter, in general an operational amplifier with an impedance in its feedback path may be used to implement a current-to-voltage converter. For example, current-to-voltage converters 222 (FIGS. 2A and 2B) may include: a conventional trans-impedance amplifier, an amplifier with multiple trans-impedance, trans-conductance, and/or trans-impedance stages, an amplifier with common-gate and trans-impedance stages, and/or an amplifier with a regulated cascode common-gate and trans-impedance stages.

Referring back to FIG. 2A, because the temperature, the power supply and the optical signal may change relatively slowly, the biasing of current-to-voltage converter 222-1 may be calibrated periodically (or as needed, such as when there are drifts or temperature changes relative to a previous calibration) so that the output-voltage swing from current-to-voltage converter 222-1 is centered around Vref. In particular, during a calibration mode (described further below), feedback circuit 214 determines a value, which is also referred to as the calibration value, that corresponds to the average current, Iavg, associated with the analog electrical signal. This value may be stored in register 230, either in a digital or an analog manner. Additionally, during the calibration mode, feedback circuit 214 adjusts biasing of front-end circuit 210 (via voltage-controlled current source 220) based at least on the calibration value, thereby calibrating the analog electrical signal relative to Vref, which corresponds to a zero-to-one decision threshold of digital slicer 212.

Note that Vref may be approximately mid-way between a high voltage (Vhi) output by front-end circuit 210 and a low voltage (Vlow) output by front-end circuit 210 (i.e., it may be the crossover voltage or Vc). In some embodiments, Vref is fixed. However, in other embodiments Vref is adjusted during the calibration mode.

In some embodiments sense amplifier(s) 224 may include two interleaved strong-arm sense amplifiers. These interleaved strong-arm sense amplifiers may be gated or evaluated on opposite phases of clock signal(s) 226 (i.e., optical receiver 200 may be double data rate or DDR).

In embodiments that include two interleaved sense amplifiers, which trigger on the opposite phases of clock signal(s) 226 in sense amplifier(s) 224, a data update may occur every half cycle. Note that if optical receivers 200 and 250 (FIG. 2B) include a single sense amplifier, feedback circuit 214 can remove the offset (Voffset) of the sense amplifier by centering current-to-voltage converter 222-1 on Vref plus Voffset. However, if the two sense amplifiers have different offsets, feedback circuit 214 may leave a residual offset midway between the two offsets.

In some embodiments, feedback circuit 214 includes: a digital integrator 228 (such as a digital counter that is incremented or decremented based at least on the output from digital slicer 212) or a digital calibration circuit; register 230; a digital-to-analog converter (DAC) 232; and voltage-controlled current source 220. Note that the output from DAC 232 adjusts the current through voltage-controlled current source 220, which biases current-to-voltage converter 222-1.

In some embodiments, feedback circuit 214 includes a clock circuit (not shown) to generate different clock signals 226 for sense amplifier(s) 224 and other circuits depending on the region of operation. For example, sense amplifier(s) 224 may be clocked by a 2.5 GHz clock during normal operation and by a 312.5 MHz (divide by 8) clock during calibration. This slow clock may allow sufficient time for the update to the bias to happen through feedback circuit 214 in one-half clock cycle before a new result is produced by sense amplifier(s) 224.

In some embodiments, the clock circuit produces the slow clock using a series-connected 3-toggle flip-flop design (divide by 8). Furthermore, the sense amplifier(s) 224 may be multiplexed from the fast and slow clock signals depending on the mode of operation. Note that the skew in the high-speed clock signal caused by this multiplexing may be accounted for in the timing margin for the output from sense amplifier(s) 224 to be captured by the global data path. To save power, the clock signal for feedback circuit 214 may be disabled during normal operation.

Additionally, control logic 234 may provide signals or instructions that transitions optical receivers 200 and/or 250 (FIG. 2B) from a normal operating mode to the calibration mode, and from the calibration mode to the normal operating mode during recalibration. (For example, control logic 234 may turn on or enable clock signal(s) 226 to integrator 228 during the calibration mode.) The calibration technique may allow feedback circuit 214 to determine the calibration value without explicitly computing the average output from digital slicer 212 using an adder (such as an N-bit carry adder).

Figure 4:
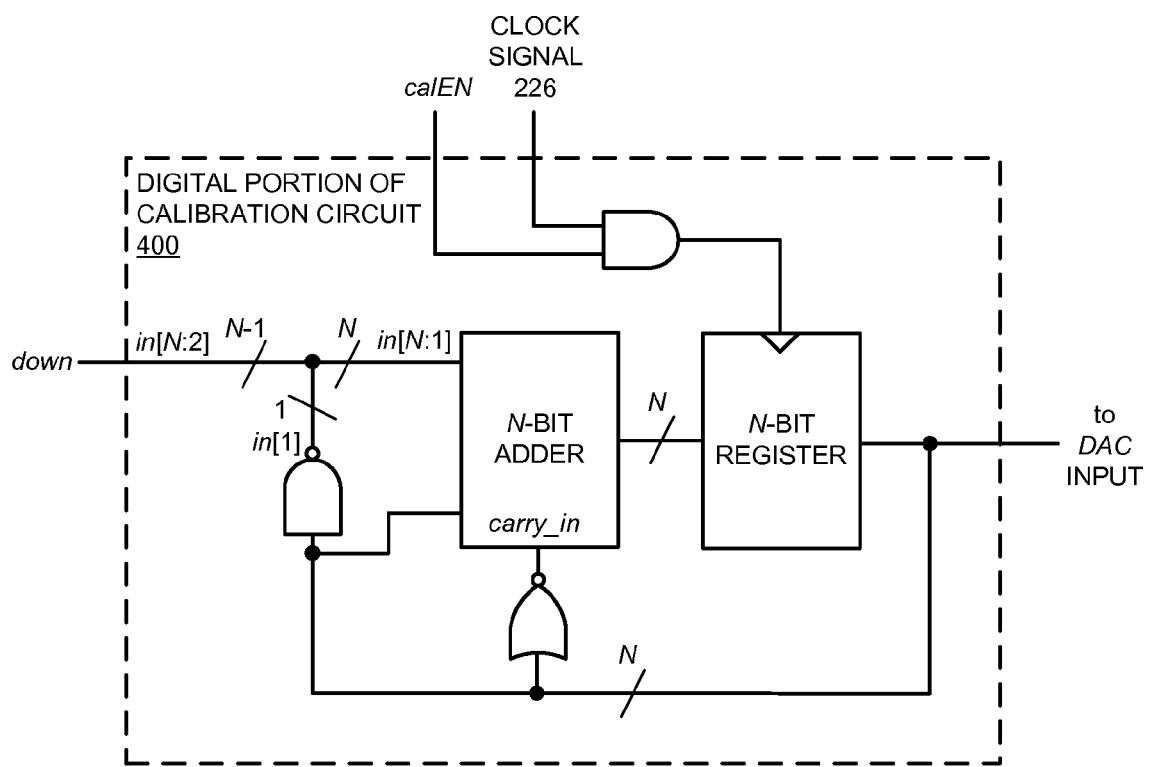
FIG. 4 is a block diagram illustrating a digital portion of the calibration circuit in the optical receivers of FIGS. 2A and 2B in accordance with an embodiment of the present disclosure.

FIG. 4 presents a block diagram illustrating an exemplary embodiment to the digital portion of calibration circuit 400 (FIG. 4) in feedback circuit 214 (FIGS. 2A and 2B), including integrator 228 (FIGS. 2A and 2B) and register 230 (FIGS. 2A and 2B). This portion of the calibration circuit receives a down signal from slicer 212 (FIGS. 2A and 2B), which is a single-bit signal that is fanned out to the N−1 most significant bits of an N-bit adder, such as a static CMOS ripple carry adder employing XOR gates. Moreover, the N-bit adder increments or decrements the bias value stored in an N-bit register, such as N DDR flip flops, and the N-bit NAND and NOR prevent the N-bit adder from wrapping around when it reaches its limit. Furthermore, the calEn signal enables the calibration mode, and the DAC input signal goes to DAC 232 (FIGS. 2A and 2B). Note that in some embodiments the N-bit adder is a counter, such as an up-down counter. In some embodiments, the N-bit adder is a saturation adder.

Furthermore, note that the N-bit adder may be implemented differently than an adder that computes the average current directly (i.e., by averaging the top and bottom values output by DAC 232 in FIGS. 2A and 2B). Consequently, the feedback circuit 214 (FIGS. 2A and 2B) may include less memory than existing calibration techniques.

Figure 5:
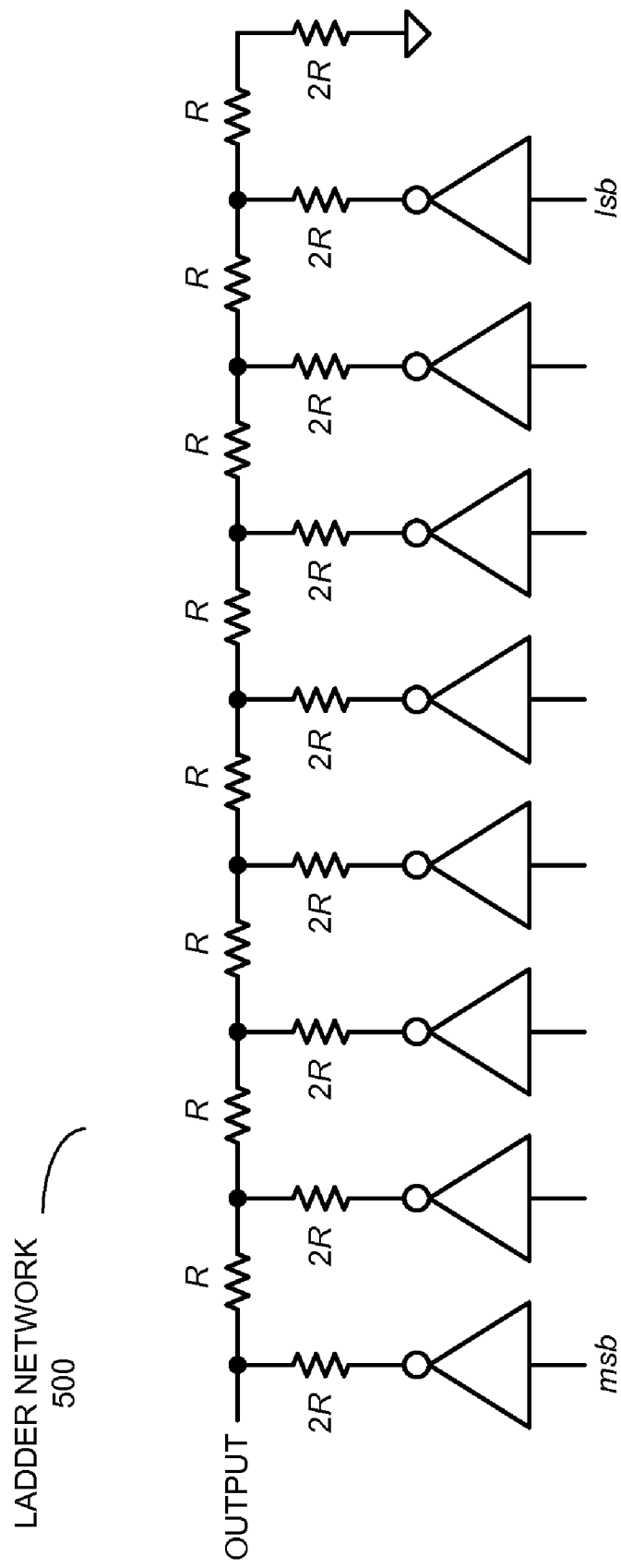
FIG. 5 is a block diagram illustrating a ladder network in the DAC in the optical receivers of FIGS. 2A and 2B in accordance with an embodiment of the present disclosure.

FIG. 5 presents a block diagram illustrating an exemplary ladder network 500 in DAC 232 in optical receivers 200 and 250 (FIGS. 2A and 2B). This ladder network includes an 8-input (for N=8 bits of DAC resolution) R-2R polysilicon resistor ladder DAC driven by inverters. The output is obtained as a binary-weighted fraction of Vdd according to the input byte. Note that the polysilicon width for a given resistor may be wide enough to have negligible resistance variation. Furthermore, to avoid data-dependent errors associated with a non-zero driver resistance, the resistance of the ladder segments may be at least an order of magnitude higher than that of the drivers. In principle, either the size of the drivers may be increased to reduce their resistance or the length of the resistor polysilicon may be increased to increase the segment resistance. Both approaches increase the area footprint. For the smallest area, ladder network 500 may be designed to achieve the optimal segment-resistance-to-driver-resistance ratio. In some embodiments, DAC 232 (FIGS. 2A and 2B) consumes a current of up to 100 μA.

Note that the output from DAC 232 (FIGS. 2A and 2B) can spike due to an abrupt change of its input bits as the adder in the digital portion of calibration circuit 400 (FIG. 4) evaluates and/or because of non-monotonicity due to nonlinearities. While these spikes can be filtered by using a low-pass filter, this may not be necessary if the output of current-to-voltage converter 300 (FIG. 3) settles within a half cycle of the slower calibration clock period.

Furthermore, while FIG. 5 illustrates a particular embodiment of a DAC, in general a wide variety of DACs may be used, as is known to one of skill in the art.

Referring back to FIG. 2A, in some embodiments voltage-controlled current source 220 at the input of current-to-voltage converter 300 (FIG. 3) is a pull-down native n-type metal-oxide-semiconductor (NMOS). This NMOS transistor may be biased to pull an average current Iavg away from photodiode 216, so that output of current-to-voltage converter 300 (FIG. 3) swings equally around the zero-input reference point (i.e., Vref). If current-to-voltage converter 300 (FIG. 3) or the sense amplifier(s) 224 has an inherent offset due to process variations, the pull-down NMOS transistor also helps in biasing the output of current-to-voltage converter 300 (FIG. 3) at Vref In this case the pull-down current may be different from the actual average of the photodiode current. In other embodiments, voltage-controlled current source 220 includes a binary weighted current source tree and/or a digital-to-analog converter followed by a trans-conductance stage.

Furthermore, the bias of voltage-controlled current source 220 may be set periodically (or as needed). For example, the control signals indicating the start and end of calibration may be broadcast to all the optical transmitters and optical receivers in an optical system simultaneously. During this time, the optical transmitters may transmit a specific calibration pattern while the optical receivers re-adjust their Vrefs and/or their calibration values.

Figure 6:
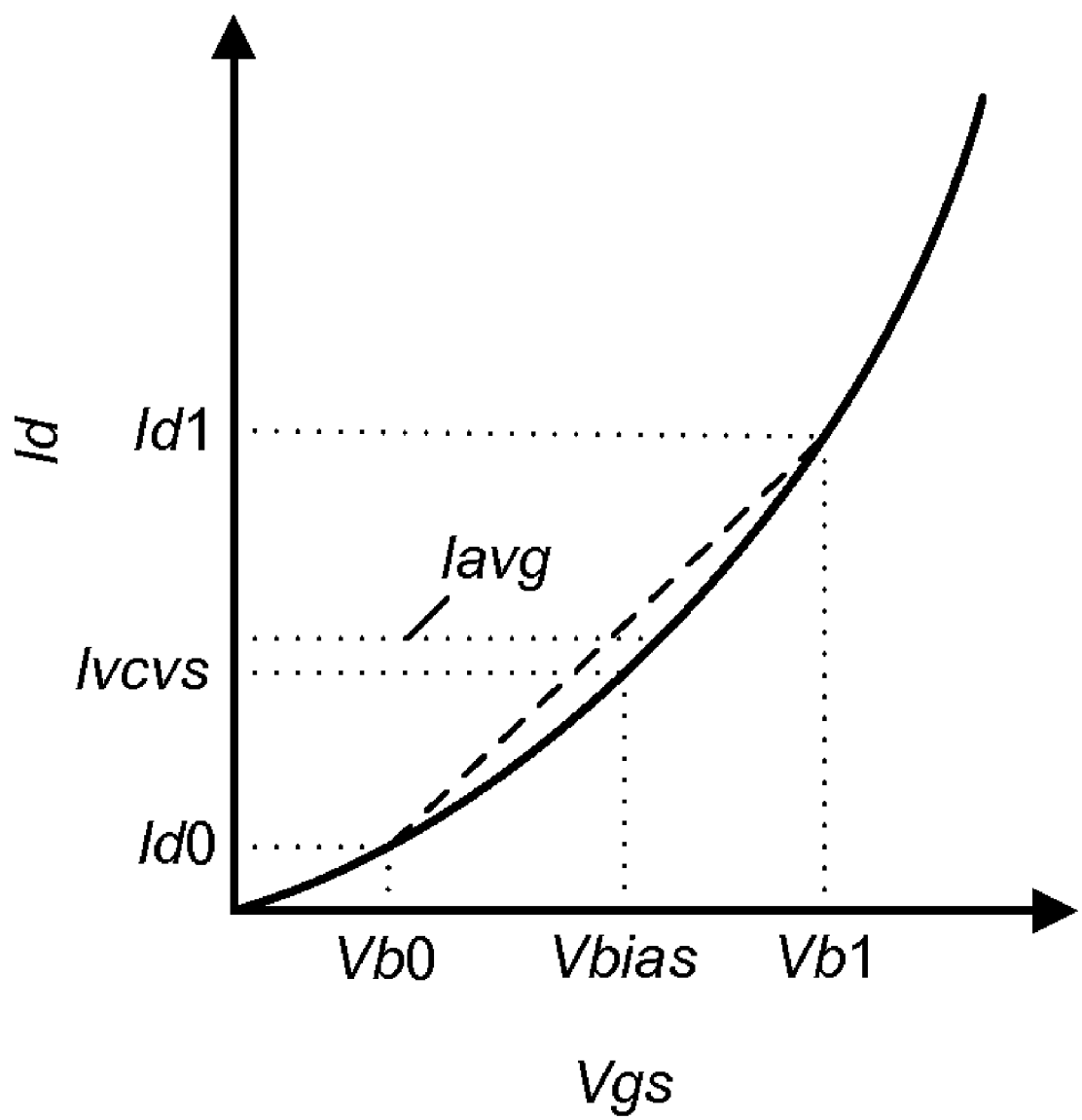
FIG. 6 is a graph illustrating the effect of voltage-controlled current-source nonlinearity in the optical receivers of FIGS. 2A and 2B in accordance with an embodiment of the present disclosure.

Note that voltage-controlled current source 220 at the input to current-to-voltage converter 300 (FIG. 3) may or may not be a linear voltage-controlled current source (VCCS). As shown in FIG. 6, which presents a graph illustrating the effect of transistor nonlinearity, the drain current-gate-source voltage (Id-Vgs) relationship for the NMOS transistor may be quadratic, which means that the current drawn for an average bias Vbias provided by DAC 232 (FIGS. 2A and 2B) equal to $(Vb_0+Vb_1)/2$ may be less than the average of the extreme currents, i.e., Ivcvs may be less than Iavg, which equals $(Id_1+Id_0)/2$. This may partially compensate for the asymmetric gain of the current-to-voltage converter 300 (FIG. 3) around its center voltage due to asymmetry in the resistance of the NMOS transitors used in the feedback path. Indeed, simulations with a linear VCCS at the input to current-to-voltage converter 300 (FIG. 3) indicate that current-to-voltage converter 300 (FIG. 3) exhibits non-symmetric swing around Vref, which reduces the voltage margin.

Referring back to FIG. 2A, note that current through voltage-controlled current source 220 shifts the analog electric signal to a high-gain point of current-to-voltage converter 222-1 (i.e., this current biases current-to-voltage converter 222-1). In particular, during the normal operating mode voltage-controlled current source 220 sinks Iavg from the input to current-to-voltage converter 222-1, thus centering the bias at the input of current-to-voltage converter 222-1 to the middle of its operating regime. In addition, voltage-controlled current source 220 sinks a small current (Ioff) that compensates for the cumulative offset in front-end circuit 210 and digital slicer 212. (Ioff corresponds to a systematic differential offset voltage at the input(s) of sense amplifier(s) 224.) In the discussion that follows, Ioff is inherently included in the biasing provided by voltage-controlled current source 220 and therefore is not discussed explicitly.

We now further describe embodiments of operation of optical receivers 200 (FIG. 2A) and 250 (FIG. 2B) in the calibration mode. In some embodiments, the calibration technique serves to determine the optimal biasing conditions for the gain stage in the optical receiver, while concurrently compensating for undesired offsets in the system, such as the offset due to physical variations and manufacturing mismatches in the front-end circuit and the digital slicer, which can result in an offset output voltage from the optical receiver even in the absence of an input optical signal. The calibration technique may reduce the size, cost, power consumption and complexity of the optical receiver. For example, gain centering and offset calibration may be performed using a single feedback loop. Furthermore, the optical receiver may be able to receive an optical signal that has no run-length constraints, thereby obviating the need for a DC-free encoding scheme in the optical system, which reduces the communication bandwidth penalty and decoding latency associated with DC-free encoding.

In one embodiment of the calibration technique, explicit averaging or table lookup of two digitally stored values corresponding to two steady states may be used. For example, during a calibration mode optical transmitter 110 (FIG. 1) may first transmit a constant optical signal corresponding to a logical '1.' After feedback circuit 214 has reached steady-state, an internal state 1 of this feedback loop (such as an output of integrator 228) may be measured. Then, optical transmitter 110 (FIG. 1) may transmit a constant optical signal corresponding to a logical '0.' Once again, after feedback circuit 214 has reached steady-state, an internal state 0 of this feedback loop (such as an output of integrator 228) may be measured.

Next, control logic 234 may average internal state 0 and internal state 1 to produce a value that is stored in register 230. During the normal operating mode, this value may be used to produce a signal that is subtracted from node 218. For example, current source 220 may sink a current based at least on the stored value. This current may be midway between the currents produced by photodiode 216 in response to a constant optical signal corresponding to a logical '1' and a constant optical signal corresponding to a logical '0.'

Note that, rather than storing the average value, in some embodiments the signal is produced based at least on the average of internal state 0 and internal state 1, i.e., these internal states may be stored in register 230.

Table 1 provides pseudo-code for this embodiment of the calibration technique.

TABLE 1

```
// Variables
n = DAC_RESOLUTION;
tau = UPDATE_CYCLE;
// Sending one's
transmitter_send (ONE);
receiver_runningSum = 0;
receiver_enableFeedback( );
wait (2**n*tau);
receiver_disableFeedback( );
receiver_storeRegisterA = receiver_runningSum;
// Sending zero's
transmitter_send (ZERO);
receiver_resetRunningSum = 2**n;
receiver_enableFeedback( );
wait(2**n*tau);
receiver_disableFeedback( );
receiver feedback =
(receiver_runningSum + receiver_storeRegisterA) >> 2;
// Normal operation
transmitter_send (DATA);
```

TABLE 1-continued

```
// During wait:
// receiver_runningSum += receiver_output;
// receiver_feedback = receiver_runningSum;
```

Figure 7:
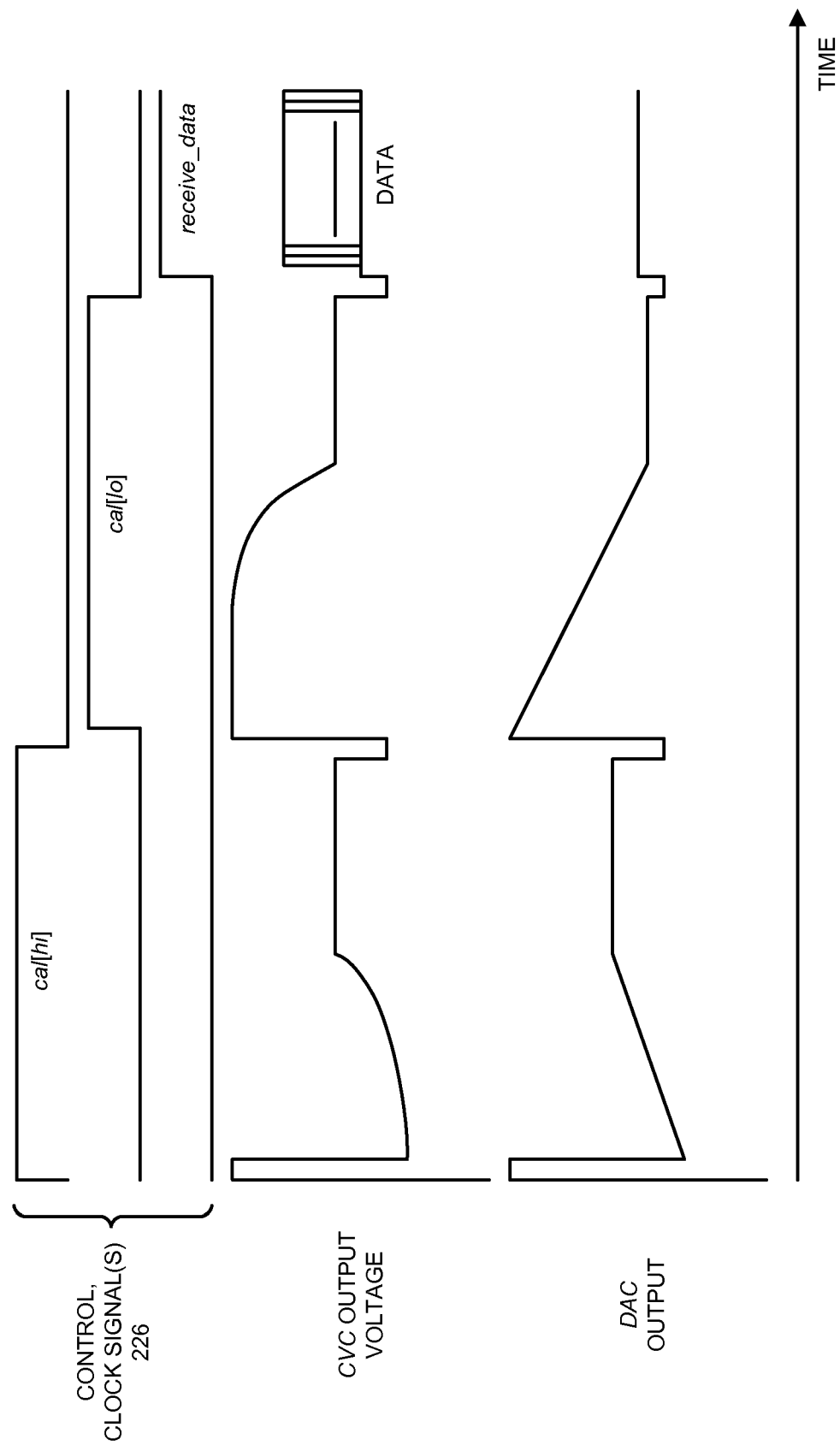
FIG. 7 is a graph illustrating voltages during calibration of the optical receivers of FIGS. 2A and 2B in accordance with an embodiment of the present disclosure.

FIG. 7 presents a graph illustrating voltages during calibration of a given optical receiver, such as optical receiver 200 (FIG. 2A) and/or optical receiver 250 (FIG. 2B). In this example, control clock signals 226 (FIGS. 2A and 2B) transition feedback circuit 214 (FIGS. 2A and 2B) to and from the calibration mode. In particular the control signals cal[lo] and cal[hi] are used to define two phases during the calibration mode, and the control signal receive_data is used to transition the given optical receiver to the normal mode. The middle portion of this graph illustrates the CVC output voltage feeding into digital slicer 212 (FIGS. 2A and 2B) during the different phases of the calibration mode, and the bottom portion of this graph illustrates the DAC output feeding into current source 220 (FIGS. 2A and 2B).

The bottom portion of this graph also indicates what happens to the data during different phases of the calibration mode. For example, when the transmitter is sending a low signal (such as a signal corresponding to a logical '0'), DAC 232 (FIGS. 2A and 2B) is initially reset to its highest value and, via the feedback loop, its value may be changed until the current drawn by current source 220 (FIGS. 2A and 2B) and $I_0$ drawn by CVC 222-1 (FIGS. 2A and 2B) cause the CVC output voltage to dither around the decision threshold set by Vref (which may be provided by CVC 222-2 in FIG. 2B). Similarly, when the transmitter is sending a high signal (such as a signal corresponding to a logical '1'), DAC 232 (FIGS. 2A and 2B) is initially reset to its lowest value and, via the feedback loop, its value may be changed until the current drawn by current source 220 (FIGS. 2A and 2B) and $I_1$ drawn by CVC 222-1 (FIGS. 2A and 2B) cause the CVC output voltage to dither around the decision threshold set by Vref.

At the end of cal[lo], the value of register 230 (FIGS. 2A and 2B) may be stored, and at the end of cal[hi] the value of register 230 (FIGS. 2A and 2B) may also be stored. Then, during the normal mode, a digital average of these register values for the settings of DAC 232 (FIGS. 2A and 2B) or an optimal setting of DAC 232 (FIGS. 2A and 2B), which can take into account the nonlinearities in both current source 220 (FIGS. 2A and 2B) and/or in CVC 222-1 (FIGS. 2A and 2B), may be obtained, for example, via a look-up table. Note that at the end of cal[lo] and cal[hi], the CVC output voltage may hover about the decision threshold, and that the DAC output may remain relatively flat or unchanged, which indicates a steady state corresponding to the digitally stored value in register 230 (FIGS. 2A and 2B) at the end of the respective phase of the calibration mode.

Figure 8:
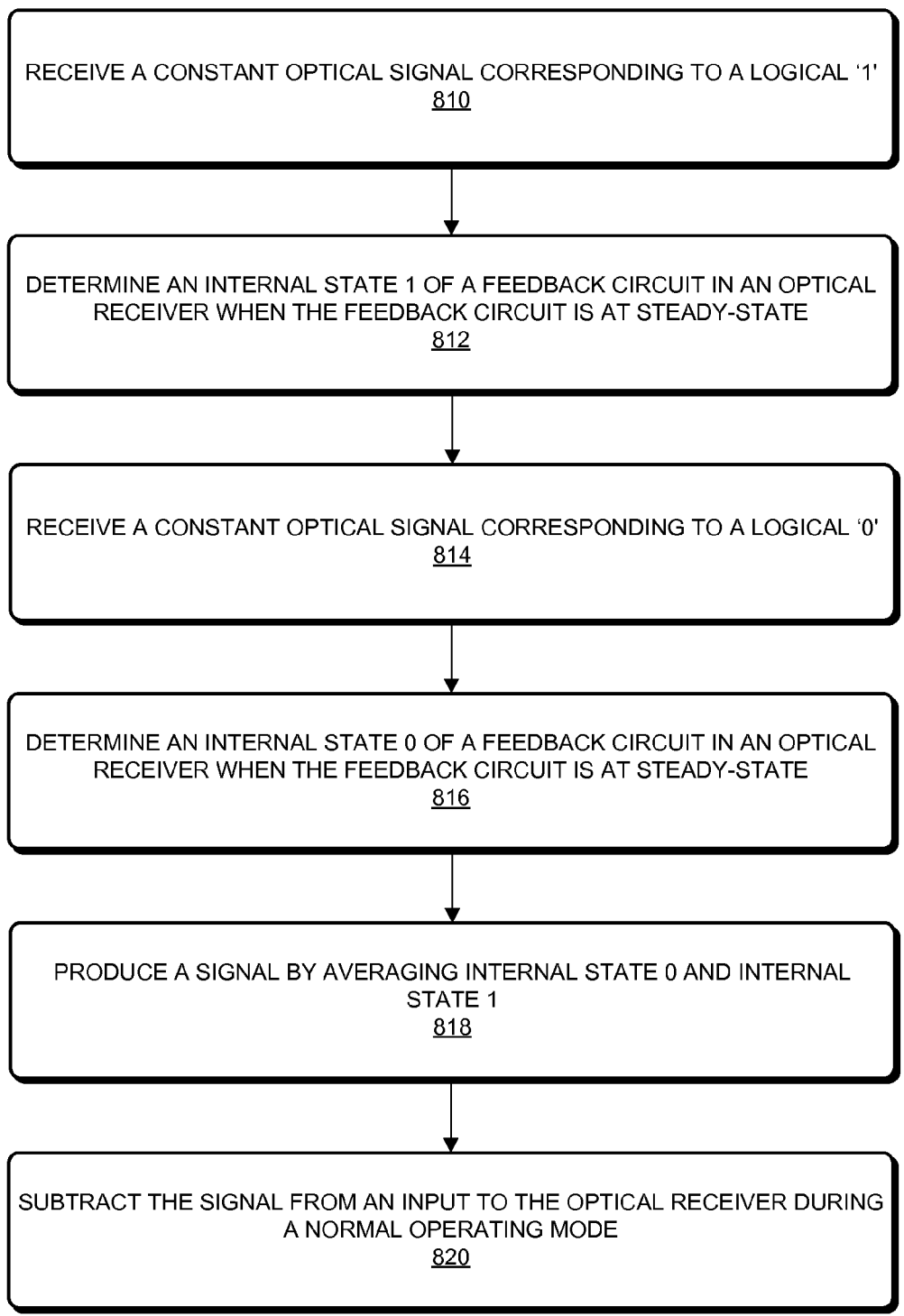
FIG. 8 is a process for calibrating the optical receivers of FIGS. 2A and 2B in accordance with an embodiment of the present disclosure.

A process 800 corresponding to this embodiment is shown in FIG. 8. This process may be used to calibrate optical receiver 200 (FIG. 2A) and/or 250 (FIG. 2B), and therefore may be performed by either optical receiver. During this method, the optical receiver receives a constant optical signal corresponding to a logical '1' (810), and determines an internal state 1 of a feedback circuit in the optical receiver when the feedback circuit is at steady-state (812). Then, the optical receiver receives a constant optical signal corresponding to a logical '0' (814), and determines an internal state 0 of the feedback circuit in the optical receiver when the feedback circuit is at steady-state (816). Next, the optical receiver produces a signal by averaging internal state 0 and internal state 1 (818). Moreover, the optical receiver subtracts the signal from an input to optical receiver during a normal operating mode (820).

Figure 9:
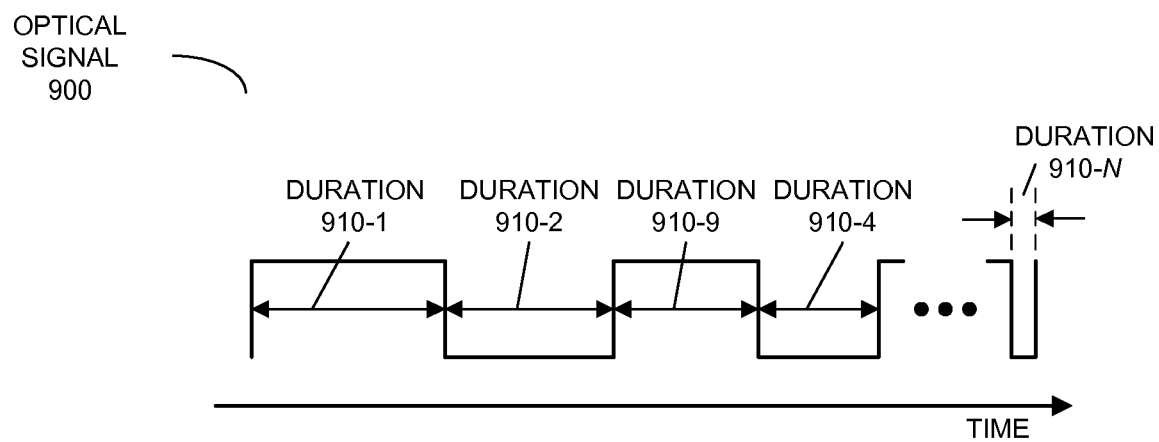
FIG. 9 is a timing diagram illustrating an optical signal during calibration of the optical receivers of FIGS. 2A and 2B in accordance with an embodiment of the present disclosure.

In another embodiment of the calibration technique, a monotonically decreasing alternating sequences of symbol types is used. FIG. 9 presents a timing diagram illustrating an optical signal 900 during calibration of optical receiver 200 (FIG. 2A) and 250 (FIG. 2B). As shown in this figure, the alternating sequence allows feedback circuit 214 (FIGS. 2A and 2B) to iteratively determine the value corresponding to the average current. In particular, the optical signal corresponds to a logical '1' for a duration 910-1. Then, the optical signal corresponds to a logical '0' for a duration 910-2, which is shorter than duration 910-1. Note that by the end of duration 910-1, photodiode 216 (FIGS. 2A and 2B) may output current $I_1$, which equals Iavg+Isig. Voltage-controlled current source 220 (FIGS. 2A and 2B) may pull this current so that there is no current input to current-to-voltage converter 222-1 (FIGS. 2A and 2B). Therefore, by the end of duration 910-1, current-to-voltage converter 222-1 (FIGS. 2A and 2B) may output Vref, and the output from sense amplifier(s) 224 (FIGS. 2A and 2B) may oscillate between logical '0' and '1.'

Similarly, by the end of duration 910-2, photodiode 216 (FIGS. 2A and 2B) may output dark current $I_0$, which equals Iavg−Isig. The output from integrator 228 (FIGS. 2A and 2B) may decrement so that voltage-controlled current source 220 (FIGS. 2A and 2B) pulls this current, so there is no current input to current-to-voltage converter 222-1 (FIGS. 2A and 2B). Therefore, by the end of duration 910-2, current-to-voltage converter 222-1 (FIGS. 2A and 2B) may output Vref, and the output from sense amplifier(s) 224 (FIGS. 2A and 2B) may also oscillate between logical '0' and '1.'

These groups in the alternating sequence may be repeated with shorter durations 910 in each subsequent iteration. Eventually, the value in a register in feedback circuit 214 (FIGS. 2A and 2B) converges to the value halfway between the currents $I_1$ and $I_0$. Assuming linearity, voltage-controlled current source 220 (FIGS. 2A and 2B) draws the average current $(I_1+I_0)/2$, which correctly biases current-to-voltage converter 222-1 (FIGS. 2A and 2B).

In exemplary embodiments, for N equal to 8 bits of DAC 232 (FIGS. 2A and 2B) resolution, duration 910-1 is 256 clock cycles, duration 910-2 is 255 clock cycles, etc., until the duration 910 is one clock cycle. While this approach with a fixed absolute decrease in durations 910 is safe, it also converges slowly. Alternatively, in some embodiments duration 910-1 is 256 clock cycles, duration 910-2 is 246 clock cycles, duration 910-3 is 236 clock cycles, etc. However, a larger step size when decreasing the durations 910 in the alternating sequence can increase an error in the value (a small error, such as up to 5 or 10%, is tolerable). Note that the rate of decrease of durations 910 in the alternating sequence may decrease as the running digital sum converges on the value.

Table 2 provides pseudo-code for this embodiment of the calibration technique. Note that Iin is the current from photodiode 216 (FIGS. 2A and 2B), $I_1$ is the count value corresponding to the current for sending a '1,' and $I_0$ is the count value corresponding to the current for sending a '0.' Furthermore, N is the number of bits in the counter, count is the value stored in the N-bit register, i is the iteration number, and step is how many cycles the duration decreases in each iteration.

TABLE 2

```
// Definitions
maxCount = 2^N;                     // N: DAC resolution
count = initialCount;
// Main loop
```

TABLE 2-continued

```
for i = 0 to (maxCount−1) {         // (maxCount − i)
                                    is the length at the ith iteration.
    Iin = isEven(i) ? I_0 : I_1;    // Tx toggles current input to Rx
    for step = 1 to (maxCount − i) {  //
        Idac = fvccs (count);       // Idac the biasing current
        if (Idac < Iin) {           // Exemplifies decision of slicer
            count = min (maxCount, count + 1);
        } else {
            count = max (0, count−1);
        }
    }
}
```

This embodiment of the calibration technique for optical receiver 200 (FIG. 2A) and/or 250 (FIG. 2B) has the added complexity of the generation of alternating sequences at transmitter 110 (FIG. 1), but it also simplifies the required synchronization between transmitter 110 (FIG. 1) and receiver 112 (FIG. 1) during the calibration mode. In particular, receiver 112 (FIG. 1) may not require synchronization with transmitter 110 (FIG. 1) as to when it is sending symbols from the first and second groups of symbol types. Note that there may be a minimum but fixed duration from the initiation of calibration that is observed by the transmitter 110 (FIG. 1) and receiver 112 (FIG. 1) to indicate that the calibration is finished. Consequently, in some embodiments receiver 112 (FIG. 1) may not communicate with transmitter 110 (FIG. 1).

Figure 10A:
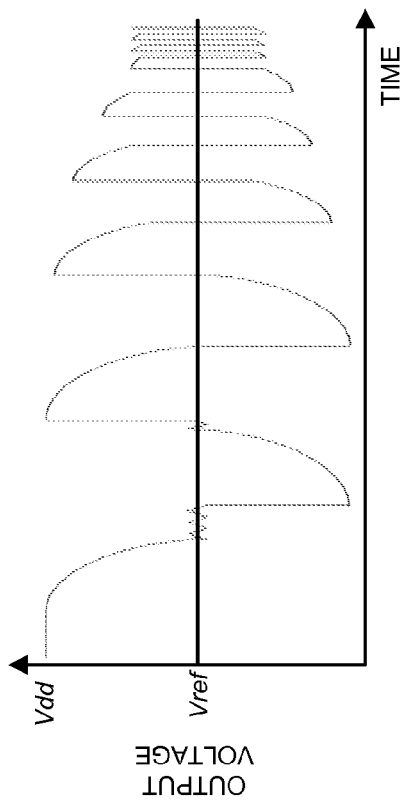
FIG. 10A is a graph illustrating voltages during calibration of the optical receivers of FIGS. 2A and 2B in accordance with an embodiment of the present disclosure.

FIG. 10A presents a graph illustrating voltages during calibration of optical receivers 200 (FIG. 2A) and/or 250 (FIG. 2B). If $I_1$ and $I_0$ fall within the dynamic range of the DAC controlled current source 220 (FIGS. 2A and 2B), then this technique can be used to determine the calibration value corresponding to the average current. Furthermore, after reaching Vref, the output of front-end circuit 210 (FIGS. 2A and 2B) may dither about this value.

Figure 10B:
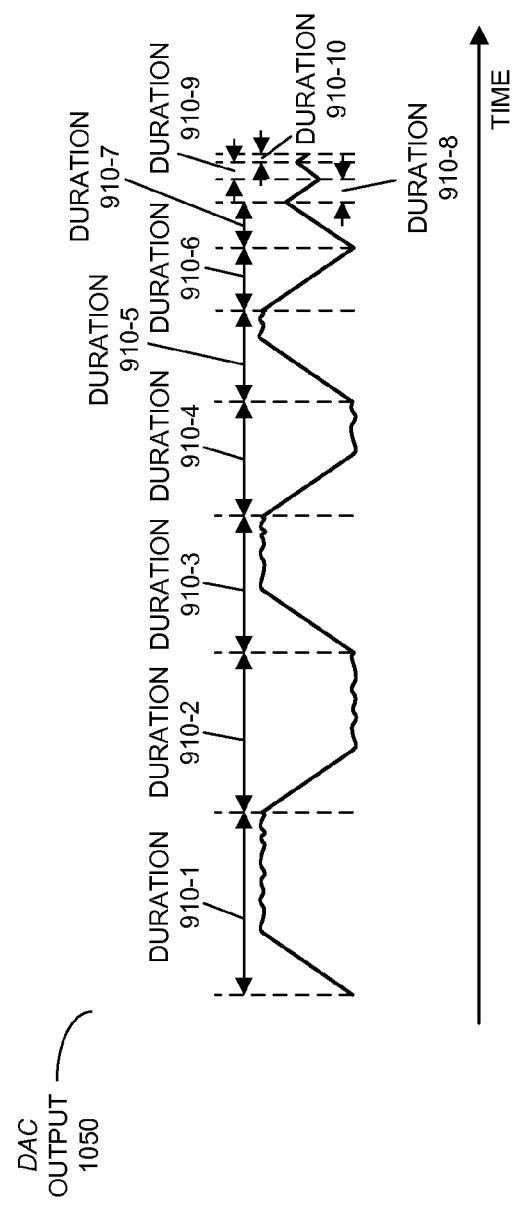
FIG. 10B is a timing diagram illustrating a digital-to-analog converter (DAC) output during calibration of the optical receivers of FIGS. 2A and 2B in accordance with an embodiment of the present disclosure.

FIG. 10B presents a timing diagram illustrating DAC output 1050 during calibration of optical receiver 200 (FIG. 2A) and/or 250 (FIG. 2B). During the calibration mode, upon receiving the '1' symbol, DAC output 1050 ramps up until it reaches the upper limit, and dithers about the upper limit. After duration 910-1 (which is initially set to the DAC range), upon receiving the '0' signal, DAC output 1050 begins to ramp down until it reaches the lower limit and dithers about the lower limit. After dithering at both limits, over multiple cycles DAC output 1050 becomes centered about the middle of the upper and lower limit, essentially 'centering' the response. In particular, in successive cycles with diminishing duration, DAC output 1050 eventually converges on the middle of the range. Note that the 'centering' process is independent of the upper and lower limits as long as they are covered by the dynamic range of DAC output 1050.

Figure 11:
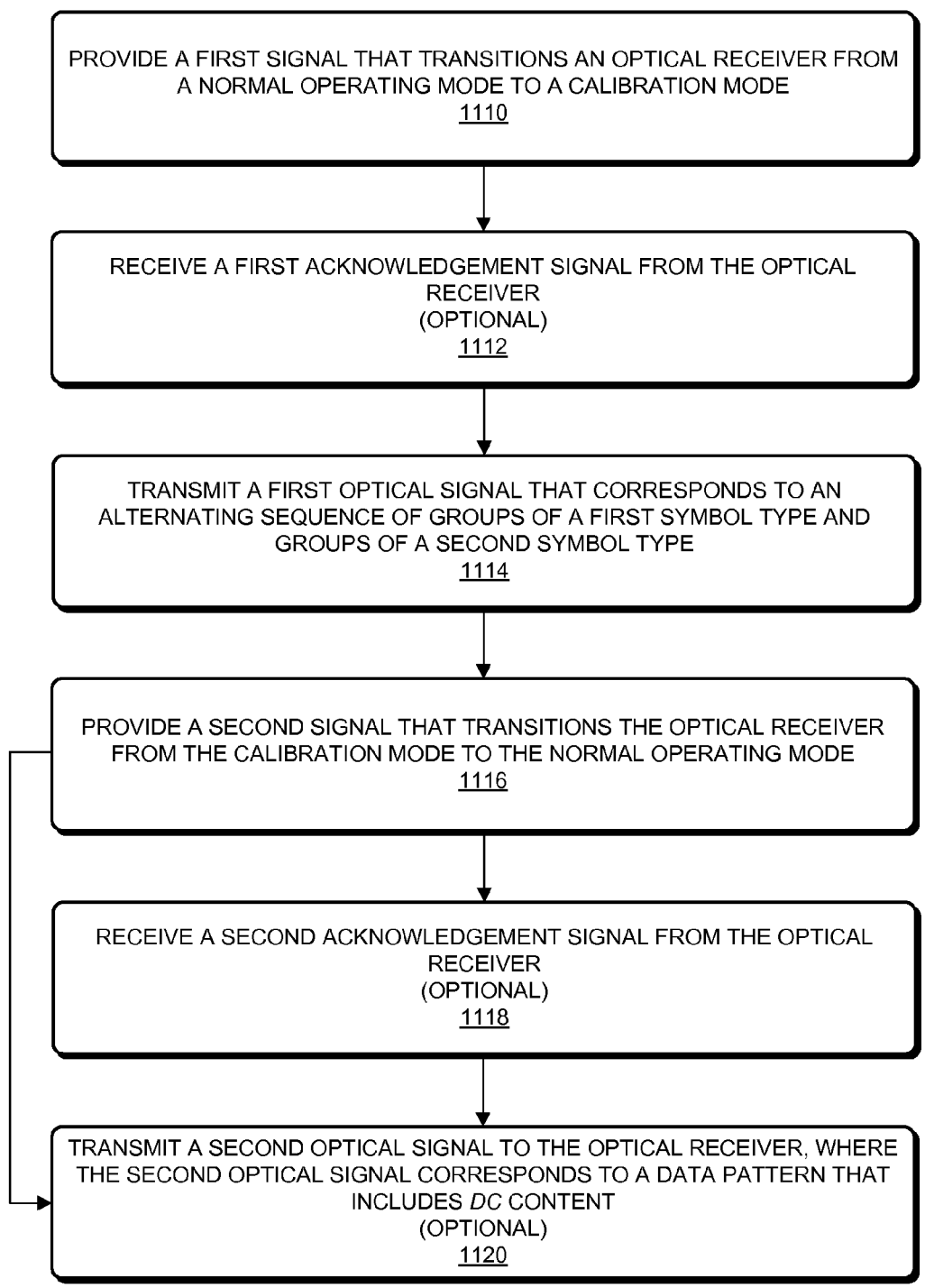
FIG. 11 is a process for calibrating the optical receivers of FIGS. 2A and 2B in accordance with an embodiment of the present disclosure.

FIG. 11 presents a process 1100 for this calibrating technique for the optical receiver 200 (FIG. 2A) and/or 250 (FIG. 2B), which may be performed by an optical transmitter (such as optical transmitter 110 in FIG. 1). During this method, the optical transmitter provides a first signal that transitions the optical receiver from a normal operating mode to a calibration mode (1110). Then, the optical transmitter transmits a first optical signal that corresponds to an alternating sequence of groups of a first symbol type and groups of a second symbol type (1114). Note that the first instance of the group of the first symbol type may have the first duration that results in the front-end circuit in the optical receiver dithering around the decision threshold and the first instance of a group of the second symbol type may have the second duration that results in the front-end circuit dithering around the decision threshold. Moreover, subsequent instances of the groups of the first symbol type may have progressively shorter durations than the first duration and subsequent instances of the groups of the second symbol type may have progressively shorter durations than the second duration. Next, the optical transmitter provides a second signal that transitions the optical receiver from the calibration mode to the normal operating mode (1116).

In some embodiments, after providing the first signal, the optical transmitter optionally receives a first acknowledgement signal from the optical receiver (1112), and after providing the second signal, the optical transmitter optionally receives a second acknowledgement signal from the optical receiver (1118).

In some embodiments, the optical transmitter optionally transmits a second optical signal to the optical receiver (1120), where the second optical signal correspond to a data pattern. For example, the optical transmitter may transmit the second optical signal during a normal operating mode.

Figure 12:
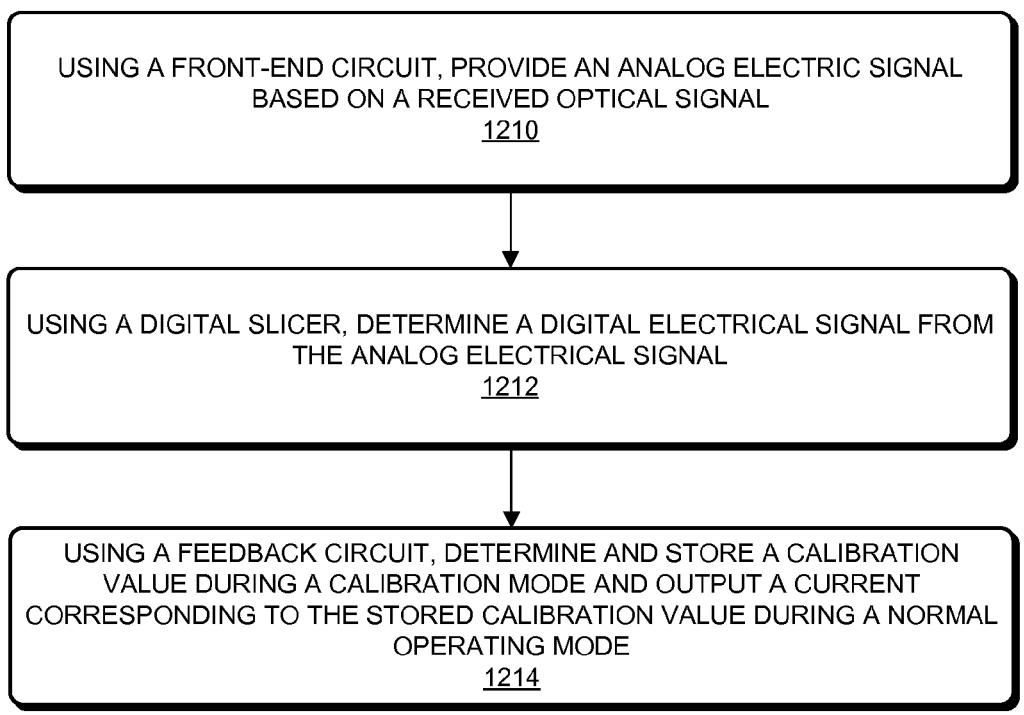
FIG. 12 is a process for calibrating the optical receivers of FIGS. 2A and 2B in accordance with an embodiment of the present disclosure.

FIG. 12 presents a process 1200 for calibrating optical receiver 200 (FIG. 2A) and/or 250 (FIG. 2B), which may be performed by either of these optical receivers. During this method, a front-end circuit in the optical receiver provides an analog electrical signal based at least on a received optical signal, such as the first optical signal (operation 1210). Then, a digital slicer in the optical receiver determines a digital electrical signal from the analog electrical signal (operation 1212). Next, during the calibration mode, the feedback circuit determines and stores a calibration value that calibrates the analog electrical signal relative to the reference voltage (operation 1214). Furthermore, during the normal operating mode of the optical receiver, the feedback circuit outputs a current corresponding to the stored calibration value that specifies the bias point of the front-end circuit (operation 1214).

Figure 13:
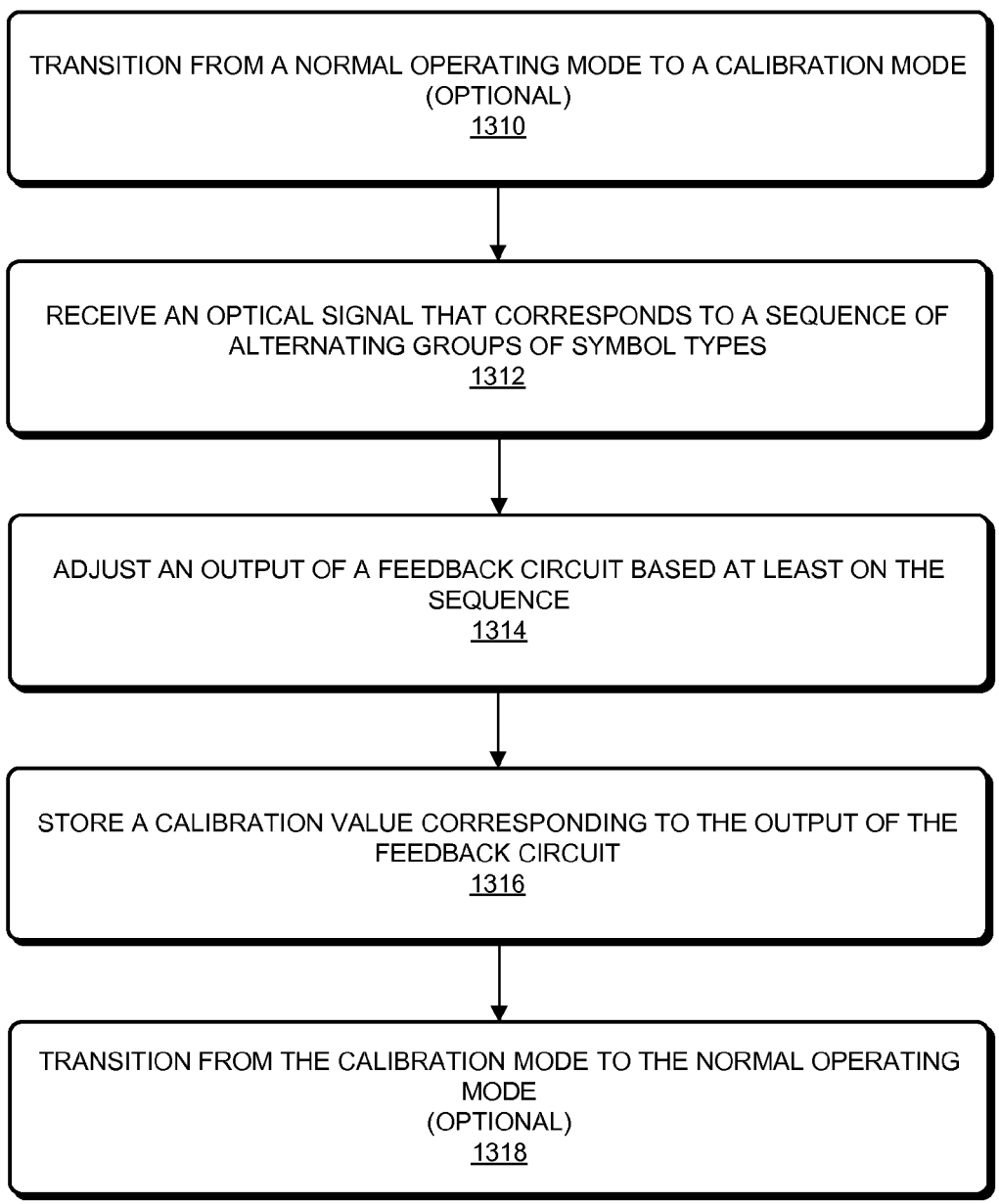
FIG. 13 is a process for calibrating the optical receivers of FIGS. 2A and 2B in accordance with an embodiment of the present disclosure.

FIG. 13 presents a process 1300 for calibrating optical receiver 200 (FIG. 2A) and/or 250 (FIG. 2B), which may be performed by either of these optical receivers. During this method, the front-end circuit in the optical receiver receives an optical signal (such as the first optical signal) that corresponds to the sequence with alternating groups of symbol types that correspond to binary values (operation 1312), where durations of the groups of the given symbol type, which can correspond to the first binary value or the second binary value, progressively decrease during the sequence. Furthermore, initial durations of groups corresponding to the first binary value and the second binary value are each sufficient for a feedback circuit in the optical receiver to reach steady state so that an output of a front-end circuit in the optical receiver dithers around a decision threshold of a digital slicer in the optical receiver. Then, the output of the feedback circuit is adjusted based at least on the sequence (operation 1314). When the durations of groups corresponding to the first binary value and the second binary value reach their minimum values in the sequence, the calibration value corresponding to the output of the feedback circuit is stored for use during the normal operating mode of the optical receiver (operation 1316).

In some embodiments, the optical receiver optionally transitions from a normal operating mode to a calibration mode prior to receiving the optical signal (1310), and optionally transitions from the calibration mode to the normal operating mode after storing the calibration value (1318).

In some embodiments of processes 800 (FIG. 8), 1100 (FIG. 11), 1200 (FIG. 12) and/or 1300 there are additional or fewer operations. Moreover, the order of the operations may be changed and/or two or more operations may be combined into a single operation.

Furthermore, optical system 100 (FIG. 1), optical receiver 200 (FIG. 2A) and/or optical receiver 250 (FIG. 2B) may include fewer components or additional components. For example, in embodiments with two sense amplifiers, power consumption may be reduced by removing one stage in current-to-voltage converter 300 (FIG. 3) if a lower output-voltage swing can be detected using another DAC to equate the offsets of the sense amplifiers. In some embodiments, feedback circuit 224 (FIGS. 2A and 2B) includes: a delta-sigma DAC in which the up/down dither is filtered by a low-pass filter to output the control voltage for voltage-controlled current source 220 (FIGS. 2A and 2B); an analog charge pump in conjunction with a successive-approximation-register analog-to-digital converter; and/or externally computed control settings in conjunction with an on-chip DAC. Moreover, feedback circuit 214 (FIGS. 2A and 2B) may store values corresponding to the steady-state values that occur during the groups in the sequence of alternating groups of symbol types. For example, the values may be stored in register 230 (FIGS. 2A and 2B). The calibration value may be determined from these stored values, such as by determining a digital sum of the stored values or looking up the calibration value associated with the stored values using a look-up table.

Additionally, although these devices and systems are illustrated as having a number of discrete items, these embodiments are intended to be functional descriptions of the various features that may be present rather than structural schematics of the embodiments described herein. Consequently, in these embodiments, two or more components may be combined into a single component and/or a position of one or more components may be changed.

Note that some or all of the functionality of optical system 100 (FIG. 1), optical receiver 200 (FIG. 2A) and/or optical receiver 250 (FIG. 2B) may be implemented in one or more application-specific integrated circuits (ASICs) and/or one or more digital signal processors (DSPs). Furthermore, functionality in optical system 100 (FIG. 1), optical receiver 200 (FIG. 2A) and/or optical receiver 250 (FIG. 2B) may be implemented more in hardware and less in software, or less in hardware and more in software, as is known in the art. Additionally, the circuits in the preceding embodiments may be implemented using: complementary metal-oxide-semiconductor (CMOS), NMOS, p-type metal-oxide-semiconductor (PMOS) and/or bipolar junction transistors.

While the preceding embodiments included periodic (or as needed) calibration, in other embodiments there may be a dedicated calibration channel in optical system 100 (FIG. 1). This may allow optical receivers 200 (FIG. 2A) and/or 250 (FIG. 2B) to be calibrated during normal operation (e.g., continuously). Furthermore, while calibration of an optical device is used as an illustrative example, in other embodiments the calibration technique may be used with a single-ended or differential electronic receiver.

The foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art. Additionally, the above disclosure is not intended to limit the present disclosure. The scope of the present disclosure is defined by the appended claims.

What is claimed is:

1. An optical receiver, comprising:
a front-end circuit configured to receive an optical signal and to provide an analog electrical signal;
a digital slicer, coupled to the front-end circuit, configured to determine a digital electrical signal from the analog electrical signal based at least on a reference voltage that specifies a decision threshold of the digital slicer, wherein the reference voltage corresponds to the analog electrical signal when the optical signal is a predetermined optical signal; and
a feedback circuit coupled to the digital slicer and the front-end circuit, wherein, during a calibration mode of the optical receiver, the feedback circuit is configured to determine and store a calibration value that calibrates the analog electrical signal relative to the reference voltage, and wherein, during a normal operating mode of the optical receiver, the feedback circuit outputs a current corresponding to the stored calibration value that specifies a bias point of the front-end circuit.

2. The optical receiver of claim 1, wherein the feedback circuit includes:
an integrator coupled to the digital slicer;
a digital-to-analog converter (DAC) coupled to the integrator; and
a voltage-controlled current source coupled to the DAC, the front-end circuit and a power-supply node, wherein the voltage-controlled current source is configured to bias the front-end circuit by adjusting a current through the voltage-controlled current source from the front-end circuit to the power-supply node.

3. The optical receiver of claim 2, wherein the power-supply node is configured to couple to ground.

4. The optical receiver of claim 2, wherein the front-end circuit includes:
a photodiode;
an internal node coupled to the photodiode and the voltage-controlled current source; and
a first current-to-voltage converter coupled to the internal node, wherein the current through the voltage-controlled current source specifies the bias point of the first current-to-voltage converter.

5. The optical receiver of claim 1, wherein the digital slicer includes a sense amplifier.

6. The optical receiver of claim 1, wherein the reference voltage is provided by a second current-to-voltage converter, which is a replica of at least a portion of the front-end circuit; and
wherein an input of the second current-to-voltage converter is the analog electrical signal when the optical signal is the predetermined optical signal.

7. The optical receiver of claim 6, wherein the predetermined optical signal includes a null pattern.

8. The optical receiver of claim 1, further comprising control logic configured to transition the optical receiver from the normal operating mode to the calibration mode and from the calibration mode to the normal operating mode during recalibration of the optical receiver.

9. The optical receiver of claim 8, wherein the recalibration is performed periodically.

10. The optical receiver of claim 1, wherein, during the recalibration mode, the optical receiver is configured to receive another predetermined optical signal that includes a sequence of alternating groups of symbol types that correspond to binary values; and
wherein a given group in the alternating groups has an associated duration that is sufficient for the current output by the feedback circuit to reach a steady-state value.

11. The optical receiver of claim 10, wherein, during the recalibration mode, the current is adjusted to reduce a difference between the analog electrical signal and the reference voltage.

12. The optical receiver of claim 10, wherein, after the current reaches the steady-state value, the analog electrical signal dithers around a voltage corresponding to a binary value associated with the given group.

13. The optical receiver of claim 10, wherein, after the current reaches the steady-state value, the feedback circuit stores the voltage corresponding to the steady-state value.

14. The optical receiver of claim 13, wherein the calibration value corresponds to a digital sum of stored voltages corresponding to the binary values.

15. The optical receiver of claim 13, wherein the calibration value is determined using a look-up table that is indexed by stored voltages corresponding to the binary values.

16. The optical receiver of claim 1, wherein, during the normal operating mode, the current is approximately midway between a high current output by the front-end circuit for a first of the binary values and a low current output by the front-end circuit for a second of the binary values.

17. The optical receiver of claim 1, wherein the optical signal corresponds to a data pattern without a run-length limit constraint.

18. A system, comprising:
an optical transmitter configured to provide an optical signal corresponding to a data pattern; and
an optical receiver, wherein the optical receiver includes:
a front-end circuit configured to receive an optical signal and to provide an analog electrical signal;
a digital slicer, coupled to the front-end circuit, configured to determine a digital electrical signal from the analog electrical signal based at least on a reference voltage that specifies a decision threshold of the digital slicer, wherein the reference voltage corresponds to the analog electrical signal when the optical signal is a predetermined optical signal; and
a feedback circuit coupled to the digital slicer and the front-end circuit, wherein, during a calibration mode of the optical receiver, the feedback circuit is configured to determine and store a calibration value that calibrates the analog electrical signal relative to the reference voltage, and
wherein, during a normal operating mode of the optical receiver, the feedback circuit outputs a current corresponding to the stored calibration value that specifies a bias point of the front-end circuit.

19. The system of claim 18, wherein, during the recalibration mode, the optical transmitter is configured to provide another predetermined optical signal that includes a sequence of alternating groups of symbol types that correspond to binary values; and
wherein a given group in the alternating groups has an associated duration that is sufficient for the current output by the feedback circuit to reach a steady-state value.

20. A method for calibrating an optical receiver, comprising:
providing an analog electrical signal based at least on a received optical signal using a front-end circuit in the optical receiver;
determining a digital electrical signal from the analog electrical signal using a digital slicer in the optical receiver and a reference voltage that specifies a decision threshold of the digital slicer, wherein the reference voltage corresponds to the analog electrical signal when the optical signal is a predetermined optical signal;
during a calibration mode, determining and storing a calibration value that calibrates the analog electrical signal relative to the reference voltage using a feedback circuit in the optical receiver; and
during a normal operating mode of the optical receiver, outputting a current corresponding to the stored calibration value that specifies a bias point of the front-end circuit using the feedback circuit.

* * * * *